June 30, 1931.  H. H BOYCE  1,812,680
THERMOMETER
Filed July 12, 1927

INVENTOR
HARRISON H. BOYCE
BY
Hammond & Littell
ATTORNEY

Patented June 30, 1931

1,812,680

UNITED STATES PATENT OFFICE

HARRISON HURLBERT BOYCE, OF JERICHO, LONG ISLAND, NEW YORK

THERMOMETER

Application filed July 12, 1927. Serial No. 205,062.

This invention relates to improvements in thermometers or other heat indicators for various purposes and it has particular reference to a means for magnifying a portion of a column of heat actuated fluid.

This application is an improvement on and continuation in part of my copending application Serial #193,770 filed May 24, 1927, in which I have shown a thermometer particularly adapted for household purposes but applicable also to general use. It is usually desirable to provide in such thermometers means to permit certain critical ranges of temperature to be readily determined from a substantial distance without materially increasing the cost of that thermometer. In general, a thermometer to be used to indicate room temperature will be hung in an out-of the way or inaccessible position and although it is in the line of vision, the fineness of the thermometer bore and column of indicating fluid therein prevents an accurate determination of temperature condition except when the observer approaches close to the instrument. It also frequently happens that it is undesirable for the observer to approach within range for accurate determination due to excessive heat or cold or other conditions, and in such cases the temperature cannot be read with accuracy.

It is the principal object of this invention to provide a cheap, practical means for enlarging the apparent size of the bore of a thermometer tube at certain critical points which may be chosen according to the desire of the user.

It is another object of this invention to provide in combination with an imperforate back or support, a thermometer tube and an enlarging lens adjustably mounted on the back and tube adapted to permit accurate determination of the indicated temperature from a considerable distance.

It is another object of this invention to provide an adjustable magnifying lens to be superposed on an indicating thermometer stem adjacent a desired or correct temperature, the lens and thermometer being attached to an imperforate support to permit easy and quick assembly and adjustment.

Further objects and advantages of this invention will appear from the following detailed description of the attached drawings which illustrate a preferred form of embodiment of my invention and one use to which it is adapted:

Figure 1:
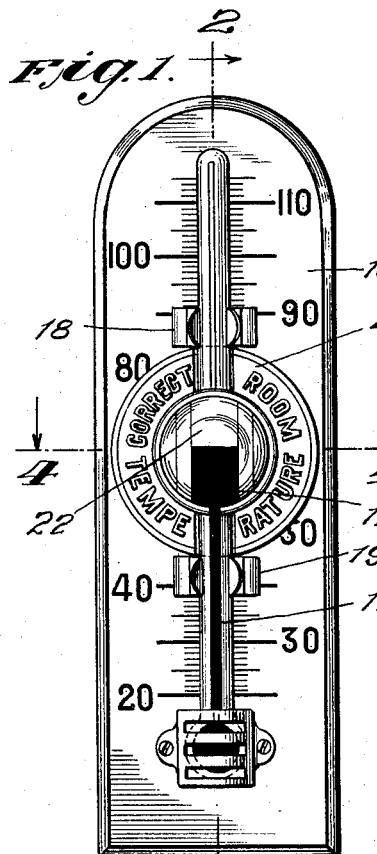
Fig. 1 is a front elevation of a thermometer showing the application of my invention thereto.

The thermometer shown is for indicating the temperature of a room or for any other use and comprises a thermometer stem 10 filled with thermally responsive indicating fluid 12, in the uniform bore 14. The thermometer 10 is adapted to be retained in position and be supported on an ordinary plane support or back 16. A calibrated scale may or may not be used to indicate the relative temperature of the surrounding atmosphere and to facilitate detection of temperature changes. To retain the thermometer in an upright position, a pair of adjustable clamps 18 and 19 which embrace the thermometer stem 10 at suitable positions are provided and may be secured to the base 16 at any desired point by means of the screws 26. A guard 20 secured to the base 16 protects the enlarged bulb portion 10a at the bottom of the thermometer stem.

Figure 4:
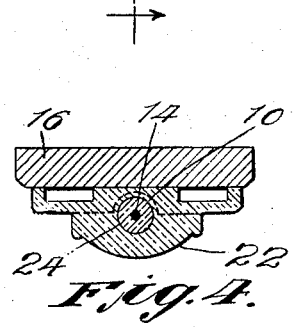
Fig. 4 is a horizontal section substantially on the line 4—4 of Fig. 1.
Figure 5:
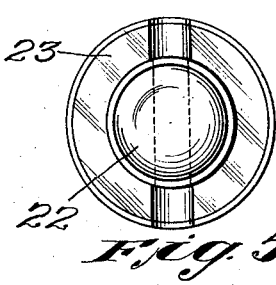
Fig. 5 is a front elevation of the lens element.
Figure 7:
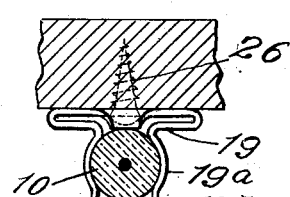
Fig. 7 is a vertical section on the line 7—7 of Fig. 3 showing the thermometer stem in place.

The magnifying lens 22 shown in Fig. 4 closely embraces the thermometer tube at any desired location and will enlarge the apparent size of the thermometer column as indicated in Fig. 1. The dial 23 cooperates with the lens 22 to set apart a portion of the indicated scale of the thermometer to more readily mark the desired or correct temperature for the room or other place and may carry insignia to show the nature of the magnified indication. As shown in Fig. 1, the dial 23 surrounds the lens 22 and for this particular thermometer indicates a correct temperature of about 65 degrees, although the range from 60 to 70 is covered by the lens and, therefore, enlarged to several times normal size as shown at 12a, Fig. 1.

It is to be understood that by the term "correct" is meant any condition in an atmosphere in which the temperature has been predetermined as desirable and for which the temperature is to be maintained uniform. The conditions might be for a living room or a cold storage room, or the thermometer might just as readily be used to indicate outdoor temperatures. The term "correct" is suggestive and not restrictive and means desired or normal.

Figure 6:
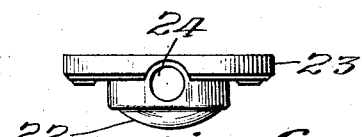
Fig. 6 is a top plan view of the lens element shown in Fig. 5.

The thermometer tube 10 passes thru an aperture 24 in the combined lens and dial indicator as shown in plan view in Figs. 4 and 6 and the lens 22 which projects from the face or forward portion of the dial, magnifies the indicated column of fluid 12, but the actual size of the bore is uniform thru-out as shown in Fig. 4 and the sensitivity of the instrument is unaffected.

Figures 2, 3:
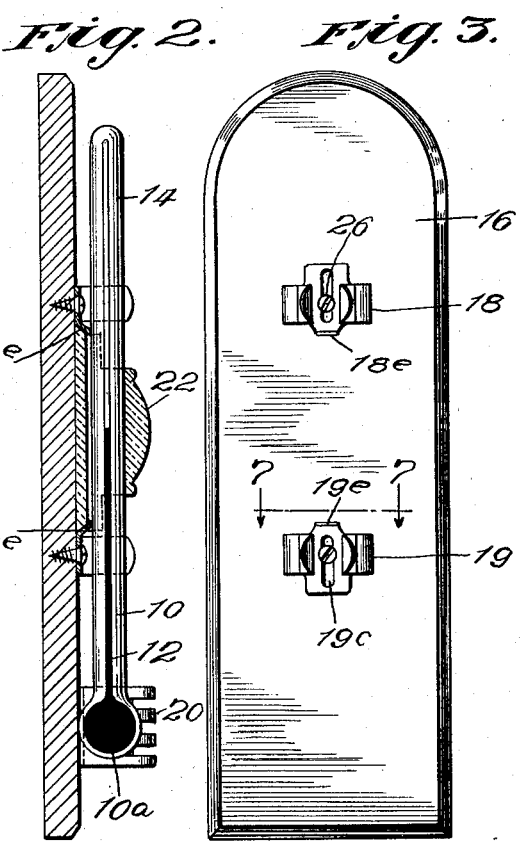
Fig. 2 is a vertical section substantially on the line 2—2 of Fig. 1.
Fig. 3 is a front elevation of a thermometer support uncalibrated and adapted to receive the thermometer stem shown in Figs. 1 and 2.

In Fig. 2 the dial portion 23 integral with the lens 22, is retained in permanent position on the support by the lips 18e and 19e on the clamps 18 and 19 and is adapted to be suitably marked in order that the appropriate condition for which the thermometer is to be used may be determined.

The clamp 19 may be a suitably folded piece of spring metal having spring fingers 19a to tightly retain the thermometer stem 10 with outwardly flared portion 19b to enable the stem to be demountably received therein. The clamp 18 is made in the same way. Slots 19c are provided in the clamps to adjustably mount the clamps and thereby the thermometer on the back or support 16 and screws 26 or other suitable devices will retain the clamps in an adjusted position.

The foregoing detailed description clearly illustrates a very economical and yet, highly effective means to mount a thermometer stem in a magnifying element which will enable the thermometer stem to be adjustably positioned in order that the particular range of temperature desired to be noted may be enlarged by the magnifying lens, and the thermometer stem properly calibrated with reference to the scale on the base 16. The same thermometer when used under different conditions of temperature-indication can be manufactured from standard parts and the stem 10 can be very readily shifted in a vertical position thru the clamps 18 and 19 or the clamps mounted in different positions on the base to provide a thermometer which magnifies any desired reading. The term "normal temperature range" means that section of the thermometer scale which it is particularly desired to magnify and for which predetermined conditions have been found desirable, and this may be a freezing temperature or a boiling temperature or any other desired reading.

Besides apparently enlarging or magnifying a certain portion of the indicating column and thus permitting observation due to the increase in size, all changes of temperature producing an apparent change from the unmagnified thermometer bore to the enlarged part will be especially noticed. The critical changes will, therefore, be obvious from a considerable distance and although this construction is ideally adapted to be used with a thermometer of any preferred form, it is shown in connection with a typical household room thermometer in which the obvious advantages of the simplified construction and highly effective use are brought about with but very little additional cost over the articles heretofore produced.

While I have described a prefered form of embodiment of this invention, it is known that other modifications may be made and I desire protection on the broad spirit of the invention as described and within the scope of the appended claims.

I claim:

1. In a thermometer for particularly indicating a specified temperature comprising a thermometer stem having a uniform bore therein partially filled with a thermally responsive indicating fluid, a supporting back, a convex lens element permanently secured to said back and provided with an opening adapted to adjustably receive the thermometer stem and means on said back to adjustably secure said thermometer stem in position thereon, said means also permitting adjustment of said lens with respect to said stem.

2. In a thermometer for particularly indicating a specified temperature comprising a thermometer stem having a uniform bore therein partially filled with a thermally responsive indicating fluid, a supporting back, a convex lens element permanently secured to said back and provided with an opening adapted to receive the thermometer stem and means on said back to adjustably secure said thermometer stem in position, said adjustable securing means comprising a pair of spring clamps adjustably fastened to the back and resiliently retaining the thermometer stem.

3. As a new article of manufacture for a thermometer and its support, a magnifying lens bored to receive said thermometer stem and to be permanently attached to the support.

4. As a new article of manufacture for a thermometer stem and its support, a magnifying element and a particularly identified dial portion on said element, the said lens element being bored to adjustably receive the thermometer stem in relation to said lens element.

5. As a new article of manufacture, a thermometer stem, a particular indicating dial, and a magnifying lens adjustably retained on the thermometer to magnify and cooperate with the dial to indicate a predetermined condition, and means adapted to hold said stem, and position said dial with respect thereto.

6. As a new article of manufacture, a thermometer comprising a plane-surface support, a combined dial and magnifying element, and slotted clamps to adjustably receive the thermometer stem and to adjustably retain the dial and magnifying element on the support and with respect to the stem.

7. As a new article of manufacture, a thermometer magnifying element having an appropriately designated dial portion, said element being apertured to adjustably receive a thermometer stem, the magnifying element magnifying a certain predetermined temperature range and the dial designating the predetermined range.

8. In a household thermometer of the class described for determining room temperature, an imperforate base, a thermometer secured to said base and having an indicating stem extending adjacent to said base, a calibrated scale of temperature on said base and adjacent said indicating stem, and a lens like element small in comparison with the length of the scale, adjacent a certain portion only of said scale and indicating stem to accentuate said portion with respect to other portions of said scale and indicating stem, said lens-like element including a dial portion.

9. A thermometer for household use, including a base, a temperature responsive device having an indicating stem, means for adjustably securing said device to said base, and a lens element small in comparison with the length of the stem and secured to said base adjacent to that portion only of the indicating stem corresponding to normal room temperature for accentuating said range in relation to other portions of said indicating stem, and means on said lens to indicate said accentuated range.

10. In a thermometer of the class described, a supporting base, a magnifying element secured thereto, a temperature indicating device having an indicating stem adjustably mounted on said base, the magnifying element being small in relation to the stem, with a small portion only of the stem cooperating with said magnifying element and accentuated thereby in relation to other portions of the stem, the adjustable mounting of said stem also permitting adjustment of the magnifying element.

In testimony whereof I have affixed my signature to this specification.

HARRISON H. BOYCE.